US008908850B2

(12) United States Patent
Allen et al.

(10) Patent No.: US 8,908,850 B2
(45) Date of Patent: *Dec. 9, 2014

(54) INTERNATIONAL ORIGIN DEPENDENT CUSTOMIZED ROUTING OF CALLS TO TOLL-FREE NUMBERS

(71) Applicant: AT&T Intellectual Property I, L.P., Atlanta, GA (US)

(72) Inventors: William H. Allen, Pleasanton, CA (US); Susanne Marie Crockett, Buffalo Grove, IL (US); Robert B. Lasken, Schaumburg, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,094

(22) Filed: Feb. 13, 2013

(65) Prior Publication Data

US 2013/0177142 A1    Jul. 11, 2013

Related U.S. Application Data

(63) Continuation of application No. 12/323,510, filed on Nov. 26, 2008, now Pat. No. 8,401,167, which is a continuation of application No. 10/660,594, filed on Sep. 12, 2003, now Pat. No. 7,764,778.

(51) Int. Cl.
| | |
|---|---|
| *H04M 7/00* | (2006.01) |
| *H04Q 3/00* | (2006.01) |
| *H04M 3/42* | (2006.01) |
| *H04Q 3/66* | (2006.01) |

(52) U.S. Cl.
CPC ... *H04M 3/4228* (2013.01); *H04Q 2213/13389* (2013.01); *H04Q 3/0045* (2013.01); *H04Q 2213/13097* (2013.01); *H04Q 3/66* (2013.01); *H04Q 2213/13376* (2013.01); *H04Q 2213/13141* (2013.01)
USPC .............................. 379/221.02; 379/221.01

(58) Field of Classification Search
USPC ............... 379/88.03, 221.02, 221.01, 221.09, 379/201.01, 219
See application file for complete search history.

(56) References Cited

U.S. PATENT DOCUMENTS

| 4,266,098 A | 5/1981 | Novak |
| 4,878,240 A | 10/1989 | Lin et al. |

(Continued)

FOREIGN PATENT DOCUMENTS

| WO | 97/44943 | 11/1997 |
| WO | 99/16230 | 4/1999 |
| WO | 99/20058 | 4/1999 |

OTHER PUBLICATIONS

Kramer, "Standalone Call Accounting: The Hardware, the Software, and the Enterprise", Communications Convergence, (Mar. 2001), downloaded from the internet at cconvergence.com/shared/article/showArticle.jhtml?articleId=8711796&pgno=1, (Jun. 2004).

(Continued)

*Primary Examiner* — William Deane, Jr.
(74) *Attorney, Agent, or Firm* — Greenblum & Bernstein, P.L.C.

(57) ABSTRACT

A tangible computer-readable storage medium is encoded with an executable computer program for routing international communications. When executed, the processor performs operations including receiving, from an international gateway via a network node, international communication origination data for an international communication to a customer's communication address. Customer routing instructions are received from the customer via a web server and are stored. The received customer routing instructions are retrieved and a determination is made of a first destination communication address based on the international communication origination data and the retrieved customer routing instructions. The first destination communication address is forwarded to the network node for routing the international communication to the destination communication address.

20 Claims, 8 Drawing Sheets

(56) References Cited

U.S. PATENT DOCUMENTS

| | | | |
|---|---|---|---|
| 4,897,866 | A | 1/1990 | Majmudar et al. |
| 5,222,125 | A | 6/1993 | Creswell et al. |
| 5,333,185 | A | 7/1994 | Burke et al. |
| 5,396,546 | A | 3/1995 | Remillard |
| 5,463,682 | A | 10/1995 | Fisher et al. |
| 5,469,500 | A | 11/1995 | Satter et al. |
| 5,506,894 | A | 4/1996 | Billings et al. |
| 5,544,320 | A | 8/1996 | Konrad |
| 5,550,909 | A | 8/1996 | Chanda et al. |
| 5,579,384 | A | 11/1996 | Seymour |
| 5,610,915 | A | 3/1997 | Elliott et al. |
| 5,764,749 | A | 6/1998 | Zelazny et al. |
| 5,825,769 | A | 10/1998 | O'Reilly et al. |
| 5,864,613 | A | 1/1999 | Flood |
| 5,884,193 | A | 3/1999 | Kaplan |
| 5,892,822 | A | 4/1999 | Gottlieb et al. |
| 5,958,016 | A | 9/1999 | Chang et al. |
| 6,023,504 | A | 2/2000 | Connolly |
| 6,032,184 | A | 2/2000 | Cogger et al. |
| 6,052,457 | A | 4/2000 | Abdelaal et al. |
| 6,104,799 | A | 8/2000 | Jain et al. |
| 6,115,040 | A | 9/2000 | Bladow et al. |
| 6,141,777 | A | 10/2000 | Cutrell et al. |
| 6,161,128 | A | 12/2000 | Smyk |
| 6,212,561 | B1 | 4/2001 | Sitaraman et al. |
| 6,240,441 | B1 | 5/2001 | Beckett et al. |
| 6,343,123 | B1 | 1/2002 | Lehmacher et al. |
| 6,377,993 | B1 | 4/2002 | Brandt et al. |
| 6,381,644 | B2 | 4/2002 | Munguia et al. |
| 6,445,694 | B1 | 9/2002 | Swartz |
| 6,456,706 | B1 | 9/2002 | Blood et al. |
| 6,463,145 | B1 | 10/2002 | O'Neal et al. |
| 6,470,386 | B1 | 10/2002 | Combar et al. |
| 6,473,407 | B1 | 10/2002 | Ditmer et al. |
| 6,490,620 | B1 | 12/2002 | Ditmer et al. |
| 6,515,968 | B1 | 2/2003 | Combar et al. |
| 6,529,596 | B1 | 3/2003 | Asprey et al. |
| 6,549,619 | B1 | 4/2003 | Bell et al. |
| 6,574,661 | B1 | 6/2003 | Delano et al. |
| 6,587,688 | B1 | 7/2003 | Chambers et al. |
| 6,631,416 | B2 | 10/2003 | Bendinelli et al. |
| 6,640,239 | B1 | 10/2003 | Gidwani |
| 6,647,112 | B2 | 11/2003 | Smith |
| 6,662,221 | B1 | 12/2003 | Gonda et al. |
| 6,678,827 | B1 | 1/2004 | Rothermel et al. |
| 6,748,439 | B1 | 6/2004 | Monachello et al. |
| 6,819,933 | B1 | 11/2004 | Tirabassi et al. |
| 7,447,301 | B2 | 11/2008 | Crockett et al. |
| 7,764,778 | B2 | 7/2010 | Allen et al. |
| 8,401,167 | B2 | 3/2013 | Allen et al. |
| 2001/0049737 | A1 | 12/2001 | Carolan et al. |
| 2002/0054587 | A1 | 5/2002 | Baker et al. |
| 2003/0007621 | A1 | 1/2003 | Graves et al. |
| 2003/0072433 | A1 | 4/2003 | Brown et al. |
| 2003/0112943 | A1 | 6/2003 | Kamil |
| 2003/0200321 | A1 | 10/2003 | Chen et al. |
| 2004/0199624 | A1 | 10/2004 | Poisson et al. |
| 2004/0243708 | A1 | 12/2004 | Stebbings |
| 2005/0114794 | A1 | 5/2005 | Grimes et al. |
| 2007/0064893 | A1 | 3/2007 | Halpern et al. |
| 2007/0071215 | A1 | 3/2007 | Cope |

OTHER PUBLICATIONS

"AT&T Business Direct," AT&T, (2003).

"Large & Global Business Customer Center: Other Convenient AT&T Business Direct Tools," downloaded from the internet at att.com/businesscenter/lgbusotheretools.html, (Apr. 2004).

"Large & Global Business Customer Center: AT&T Business Direct," downloaded from the internet at att.com/businesscenter/lgbusflabusiness_direct.htm, (Apr. 2004).

"Large & Global Business Customer Center: Quick Tour of AT&T Toll-Free Call Attempts," downloaded from the internet at att.com/businesscenter/lgbusflatfca_text.html, (Apr. 2004).

"Large & Global Business Customer Center: Quick Tour of AT&T Toll-Free Routing Control," downloaded from the internet at att.com/businesscenter/lgbusflatfrtgcntrl_text.html, (Apr. 2004).

"Large & Global Business Customer Center: Quick Tour of AT&T Electronic Maintenance," downloaded from the internet at att.com/businesscenter/lgbusflaemantenance_text.html, (Apr. 2004).

"AT&T Interactive Advantage: AT&T Interactive Advantage Online Tools," AT&T Business, (2000).

"Government Markets Platform: Toll Free Services," downloaded from the internet at business.att.com/default/?pageid=gov_gmp_tf_voice_svcs&branchid=gov_gmp, (Apr. 2004).

"Teleglobe International Toll Free Services," downloaded from the internet at teleglobe.com (Dec. 2002).

"Sprint Wholesale Toll-Free Services," downloaded from the internet at sprintbiz.com/wholesale/products/toll_free_services.pdf, (Jan. 2001).

INTERNATIONAL ORIGIN DEPENDENT CUSTOMIZED ROUTING OF CALLS TO TOLL-FREE NUMBERS

CROSS-REFERENCE TO RELATED APPLICATIONS

This is a continuation application of U.S. patent application Ser. No. 12/323,510, filed Nov. 26, 2008, which is a continuation of U.S. application Ser. No. 10/660,594, filed Sep. 12, 2003, now U.S. Pat. No. 7,764,778, the disclosures of which are expressly incorporated by reference in their entireties.

This application is related to U.S. patent application Ser. No. 10/423,004, in the names of S. Crockett et al., entitled "Toll-Free Number Blocking Override Indicator," filed on Apr. 25, 2003, now U.S. Pat. No. 7,447,301, issued Nov. 4, 2008, the disclosure of which is expressly incorporated by reference herein in its entirety.

BACKGROUND OF THE INVENTION

1. Field of the Invention

The present invention relates to the field of telecommunications. More particularly, the present invention relates to routing calls, placed to a toll-free telephone number, pursuant to a customized menu routing service.

2. Acronyms

The written description contains acronyms that refer to various telecommunications services, components and techniques, as well as features relating to the present invention. Although some of these acronyms are known, use of these acronyms is not strictly standardized in the art. For purposes of the written description, the acronyms are defined as follows:

Advanced Intelligent Network (AIN)
Automatic Number Identification (ANI)
Carrier Identification Code (CIC)
Customized Menu Routing (CMR)
Dialed Number Identification Service (DNIS)
Dual Tone Multi-Frequency (DTMF)
Electronic Key Telephone System (EKTS)
Extensible Markup Language (XML)
Federal Communications Commission (FCC)
HyperText Markup Language (HTML)
HyperText Transfer Language Protocol (HTTP)
Interactive Voice Response (IVR)
International Telecommunication Union (ITU)
Local Access and Transport Area (LATA)
Local Exchange Carrier (LEC)
North American Numbering Plan (NANP)
Numbering Plan Area (NPA)
Plain Old Telephone Service (POTS)
Public Switched Telephone Network (PSTN)
Regional Bell Operating Company (RBOC)
Service Control Point (SCP)
Service Management System (SMS)
Service Switching Point (SSP)
Signaling System 7 (SS7)
Signaling Transfer Point (STP)
Transmission Control Protocol/Internet Protocol (TCP/IP)
Transaction Capabilities Application Part (TCAP)
Uniform Resource Locator (URL)

3. Background Information

Customer involvement in building and managing call services has increased since the availability of intelligent network services, such as advanced intelligent network (AIN) services. Customers of services involving toll-free numbers, such as 800 and 888 numbers, likewise have a need to build and manage their portfolio of toll-free numbers to efficiently handle incoming calls. However, toll-free number customers are subject to numerous restrictions, some of which are not apparent due to the nature of toll-free numbers and their associated terminating directory numbers, such as plain old telephone service (POTS) numbers.

For example, a customer may contract with a toll-free number service provider for service in a limited number of states. However, when the customer builds its toll-free service, it may attempt to associate a toll-free number with a directory number in a state or region for which it has not contracted. This would result in calls being blocked when termination is attempted within the unauthorized state or region, causing frustration to the customer, as well as the customer's clientele. On the other hand, a customer may fall within an exception to a general call blocking rule, but not take advantage of the exception because either it does not know of the exception or the network does not properly implement the exception (e.g., the customized service was not built properly).

Call blocking and other limitations (as well as exceptions to the limitations) may result from regulatory parameters that may not be well known to the general public, including the customers. For example, in 1983, the Bell System was disbanded into a number of regional Bell Operating Companies (RBOCs), based on a divestiture agreement between the Federal Government and AT&T. Since that time, numerous regulatory precautions have been enacted to prevent unfair competition by the RBOCs against competitors entering the marketplace. One precaution prohibited RBOCs from offering long distance services to their own local customers, although the RBOCs were free to offer long distance service to customers outside their local service areas.

The Telecommunications Act of 1996 provided limited relief, however, entitling the RBOCs to enter the long distance market in their own localities under certain circumstances. For example, in order for the Federal Communications Commission (FCC) to grant a RBOC permission to offer in-region inter-LATA (local access and transport area) services, the RBOC must complete a competitive checklist, including the following: (i) there must be an agreement with an existing competitor for the RBOC's local service, or (ii) if no competitor has come forward, there must be a statement indicating that the RBOC is ready to provide access and interconnection for potential competitors in the local market. Access and interconnection is generally defined to include, for example, access to RBOC poles, conduits and rights-of-way, number portability, dialing parity, reciprocal compensation arrangements and availability for resale. In other words, the FCC regulations do not allow a RBOC to enter the long distance market in their own locality, unless there is evidence of a viable, independent competitor in the local market, or the RBOC has committed to terms and conditions under which it is ready and willing to offer the components of the competitive checklist.

As an additional safeguard, Section 272 of the Telecommunications Act of 1996 requires RBOCs to use separate affiliates to offer their local customers long-distance services, including, for example, long-distance telephone, telecommunications, and information services. To constitute a separate affiliate, an entity must meet certain requirements of the Telecommunications Act of 1996, establishing a minimum threshold of operational and business independence.

Therefore, when a customer of a RBOC associates a POTS number in the RBOC's local service area with a toll-free number acquired from the RBOC, calls to that toll-free number will be blocked upon attempted termination to the POTS number, for example, based on the numbering plan area (NPA) and exchange (NXX). When the customer is classified as a separate affiliate, then it falls within the exception and the blocking can be overridden to terminate toll-free calls to the local POTS number. However, enabling the customer to control and manage its toll-free services presents difficulties in implementing and maintaining the proper blocking and blocking override criteria. Therefore, such blocking and overriding parameters are not included in conventional customer managed toll-free number services.

Furthermore, conventional customer managed toll-free number services are directed to establishing routing criteria and routing toll-free calls originating domestically (i.e., within the United States or Canada). Because many customers desiring toll-free call management services are situated in global markets, calls to toll-free numbers originating in non-domestic countries are anticipated. However, these calls are either treated in the same manner as domestic calls (after appropriate translation for domestic routing) from a customized routing point of view, or customized routing is simply not available. Further, where toll-free calls originating non-domestically are routed along with domestic calls, as established by the customer, the callers may ultimately be frustrated by language or cultural barriers when the calls are answered by incompatible attendants or interactive voice messaging systems.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

Figure 1:
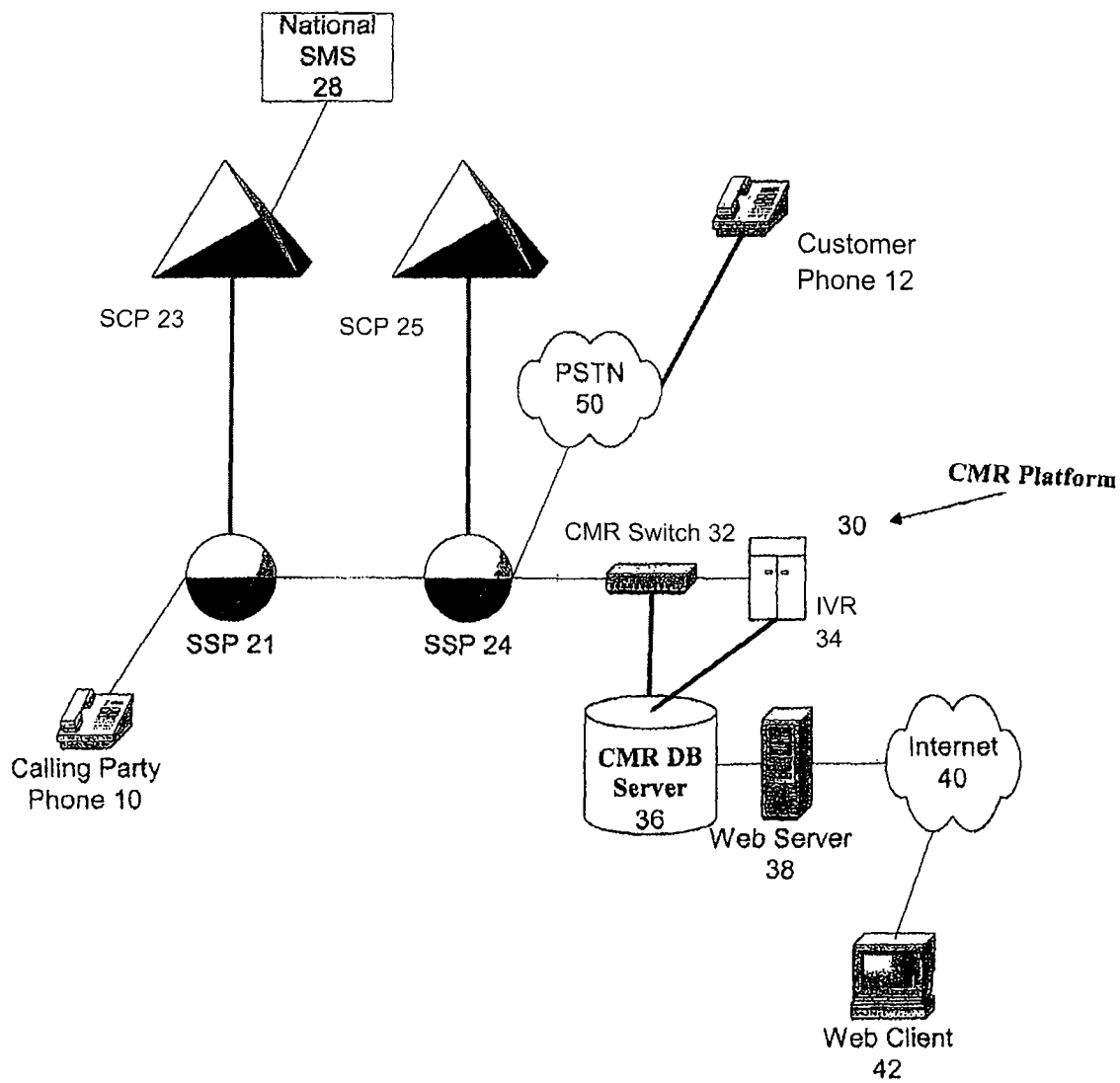
FIG. 1 is a block diagram showing an exemplary telecommunications network, according to an aspect of the present invention.

The present invention relates to enabling telecommunication customers to efficiently manage and control their telecommunication assets. More particularly, customers are provided a customized menu routing (CMR) service for managing their portfolios of toll-free telephone numbers. The CMR service includes the capability to specify call routing for calls originating in non-domestic countries to specific POTS directory numbers or other termination points best suited for handling calls from these countries.

Furthermore, the network service provider (e.g., a RBOC) imposes limits on the extent and scope of the toll-free numbers and associated services of each customer, based on, for example, the type of service and associated geographic regions to which the customer subscribes and various regulatory restrictions. The customer may then customize the routing of calls to their respective toll-free numbers within the limits imposed by the service provider, including building call trees and crafting voice announcements.

An example of a regulatory restriction that limits the customers' routing options is Section 272 of the Telecommunications Act of 1996, discussed above. Section 272 generally requires that a RBOC's in-region, inter-LATA services be provided through a separate affiliate and sets forth the requirements for qualification as an affiliate. Therefore, a customer is blocked from terminating calls to its toll-free number at a location within the RBOC's local area, unless the customer has been predetermined to qualify as a separate affiliate. Accordingly, the customer is barred from entering a blocked number (e.g., a POTS directory number, a switch identification (ID) number and/or a trunk group number) as the terminating number associated with the customer's toll-free number, unless the customer's CMR account includes a blocking override indicator (i.e., an affiliate indicator).

In view of the above, the present invention through one or more of its various aspects and/or embodiments is presented to accomplish one or more objectives and advantages, such as those noted below.

An aspect of the present invention provides a system for routing international calls to a toll-free number of a customer in accordance with a customized routing service. The system includes an international gateway that receives a call to the customer's toll-free number and populates a first portion of a calling party number field with at least data indicating that the call originated in a non-domestic country; a network switch that receives the call from the international gateway based on at least an identification of a carrier associated with the toll-free number; and a customized routing service platform that receives the call and the non-domestic call origination data from the network switch. The platform determines a destination number based on the non-domestic call origination data and routing instructions received from a web server, accessible by the customer via a packet switched data network. The destination number may be, for example, a plain old telephone service directory number or at least one of a switch identification number and a trunk group number. The platform forwards at least the destination number to the network switch for routing the call to the destination number. The international gateway may populate a second portion of the calling party number field with data indicating a country in which the call originated. The routing instructions then identify the destination number based on the country in which the call originated.

The data indicating the country in which the call originated may include a country code. The first portion and the second portion of the calling party number field may include an NPA portion and an NXX portion, respectively.

The customized routing service platform may further include a platform switch that suspends the call received from the switch and a database server that stores the routing instructions received from the web server and determines the destination number based on the stored routing instructions. The database server forwards at least the call destination number to the platform switch in response to a query. The platform switch forwards at least the call destination number to the network switch. The platform switch may release a trunk between the network switch and the platform switch via release link transfer. Also, the customized routing service platform may further include an interactive voice response unit that queries a calling party through the network switch in accordance with a predetermined script received from the web server. The platform may select the predetermined script based on at least the non-domestic call origination data received from the network switch.

Alternatively, the customized routing service platform may further include a service control point that accesses the routing instructions received from the web server and determines the destination number based on the routing instructions. The service control point forwards at least the call destination number to the network switch in response to a query. The network switch suspends the call while the service control point determines the call destination number.

Another aspect of the present invention provides a method for routing international calls to a toll-free number of a customer in accordance with a customized routing service. The method includes receiving instructions from the customer through a packet switched data network associating the toll-free number with a first destination number of the customer for calls to the toll-free number originating in a first non-domestic country. A calling party number field of the call to the toll-free number originating in the first non-domestic country is populated with at least a first code corresponding to the first non-domestic country. The call is routed to the first destination number in accordance with the received instructions, based on the first code. The packet switched data network may be a public Internet. The first destination number may include a plain old telephone service directory number, a switch identification number or a trunk group number.

Instructions may be received from the customer through the packet switched data network, associating the toll-free number with a second destination number of the customer for calls to the toll-free number originating in a second non-domestic country. A calling party number field of a call to the toll-free number originating in the second non-domestic country is populated with at least a second code corresponding to the second non-domestic country. The call is routed to the second destination number in accordance with the received instructions, based on the second code. Also, a call may be routed to the toll-free number originating domestically to a third destination number in accordance with the received instructions.

Yet another aspect of the present invention provides a system for routing international calls to an international toll-free number of a customer in accordance with a customized routing service. The system includes an international gateway, a network switch and a customized routing service platform. The international gateway receives a call to the customer's international toll-free number and translates the international toll-free number into a pseudo toll-free number and populates a calling party number field of an automatic number identification (ANI) signal with at least data indicating that the call originated in a non-domestic country. The network switch receives the call from the international gateway based on at least an identification of a carrier associated with at least one of the international toll-free number and the pseudo toll-free number. The customized routing service platform receives the call and the non-domestic call origination data from the network switch based on the pseudo toll-free number. The platform determines a destination number based on the non-domestic call origination data and routing instructions received from a web server, accessible by the customer over a packet switched data network. The platform forwards at least the destination number to the network switch for routing the call to the destination number.

The international gateway populates a second portion of the calling party number field with data indicating a country in which the call originated. The routing instructions accordingly identify the destination number based on the country in which the call originated.

The customized routing service platform may further include a platform switch that suspends the call received from the switch and a database server that stores the routing instructions received from the web server and determines the destination number based on the stored routing instructions. The database server forwards at least the call destination number to the platform switch in response to a query. The platform switch forwards at least the call destination number to the network switch. Also, the customized routing service platform may further include an interactive voice response unit that queries a calling party through the network switch in accordance with a predetermined script received from the web server. The platform selects the predetermined script based on at least the non-domestic call origination data received from the network switch.

Further, the customized routing service platform may include a service control point that accesses the routing instructions received from the web server and determines the destination number based on the routing instructions. The service control point forwards at least the call destination number to the network switch in response to a query. The network switch suspends the call while the service control point determines the call destination number.

The various aspects and embodiments of the present invention are described in detail below.

FIG. 1 illustrates an exemplary telecommunications network of the present invention. The telecommunications network includes a public switched telephone network (PSTN), including a local exchange carrier (LEC) service switching point (SSP) 21, a regional SSP 24, a calling party telephone 10 and a customer telephone 12. Both the calling party telephone 10 and the customer telephone 12 may be any type of PSTN compatible telephone, including POTS telephone, or telephones in a Centrex system, a PBX system or an electronic key telephone system (EKTS). The calling party telephone 10 is also dual tone multiple frequency (DTMF) capable, although such functionality is not necessary. In an alternative embodiment, the calling party telephone 10 may be a wireless telephone, in which case the call would access the PSTN through well-known interfacing techniques between the wireless network in which the call originates and the telecommunications network depicted in FIG. 1.

The customer telephone 12 has an associated POTS directory number, to which calls to the customer's toll-free number are terminated. More particularly, the customer associates each toll-free number with at least one corresponding POTS directory number, such as the number associated with the customer telephone 12, through a web server 38, discussed below. In an embodiment of the invention, the customer associates each toll-free number with another number that adequately identifies a resource to which the customer's toll-free number may be terminated, such as a switch ID and/or trunk group number, either in lieu of or in addition to the POTS directory number. For example, when the customer desires dedicated trunk groups for handling calls to its toll-free number, as opposed to simply directing the incoming calls to various POTS directory numbers, the switch ID and the trunk group number for each dedicated trunk group are associated with the toll-free number.

Although FIG. 1 depicts a single customer telephone 12, it is understood that the customer may have any number of telephones (represented by the customer telephone 12), without departing from the spirit and scope of the present invention. For example, when the customer has a Centrex system, incoming calls may be directed to a common number or to any one of numerous extensions. It is further understood that, in an embodiment of the invention, the customer telephone 12 represents multiple telephones or telephone systems, with different associated POTS numbers, at different geographic locations.

The SSP 21 is an end office switch servicing the calling party telephone 10. The SSP 24 is an interexchange switch, which services telephones of numerous customers, although only the exemplary customer telephone 12 is depicted in FIG. 1. The connection between the SSP 24 and the customer telephone 12 may be direct or may pass through a number of intervening switches, generally represented by the PSTN 50 in FIG. 1, without departing from the spirit and scope of the present invention. The SSP 21 and the SSP 24 may be any switch compatible with the PSTN and may include, for example, 1AESS or 5ESS switches manufactured by Lucent Technologies, Inc. (Lucent); DMS-100, DMS-200 or DMS-250 switches manufactured by Nortel Networks Corporation (Nortel); AXE-10 switches manufactured by Telefonaktiebolaget LM Ericsson, or EWSD switches available from Siemens Information and Communication Networks, Inc. The switches may utilize an AIN protocol or a Carrier AIN (CAIN) protocol. However, embodiments of the present invention may include switches, such as ATM and soft switches, that are incorporated into any alternative telecommunications technology.

The telecommunications network of FIG. 1 further includes a LEC service control point (SCP) 23 and a regional SCP 25, having Service Builder intelligence, for example. Each of the SCPs 23 and 25 includes a corresponding database (not pictured) containing information relating to various intelligent network services and routing calls. The SCP 23 is connected to the national service management system (SMS) 28, which contains a database correlating the toll-free numbers in North America with service providers and/or carriers. The SCP 23 communicates with the SSP 21 through a signaling transfer point (STP) (not pictured), using well known out-of-band signaling, such as signaling system 7 (SS7) signaling. The SCP 23 receives queries from the SSP 21, based on preset triggers, and provides instructions relating to call routing and service implementation in response. The SCP 25 similarly communicates with the SSP 24 through an STP (not pictured) using SS7 signaling, for example. The SSP 24 queries the SCP 25 in response to a trigger associated with its receipt of the toll-free number from the SSP 21.

By way of example, the SCP 23 and the SCP 25 are implemented with Telcordia Integrated Service Control Points, loaded with ISCP software, available from Telcordia, Murray Hill, N.J. In alternative embodiments, each of the SCP 23 and the SCP 25 may be any make and model of SCP, including, for example, Lucent Advantage, Nortel Service Builder, and Compagnie Financière Alcatel (Alcatel) Infusion. The call flow logic of the present invention may be upgraded to accommodate future AIN releases and protocols, without departing from the spirit and scope of the present invention.

The telecommunications network of FIG. 1 further includes a network associated with the CMR service, connected through a packet switched data network, such as the public Internet 40, to an exemplary web client 42. The network provides a CMR platform 30, which includes a CMR switch 32, an IVR 34, a CMR database server 36 and a web server 38. The CMR switch 32 may be, for example, a VCO/4K open programmable switch available from Cisco Systems, Inc. (Cisco). The IVR 34 is depicted separately from the CMR switch 32, although the functionality of the IVR 34 may be included in the CMR switch 32 in an alternative embodiment. The CMR database server 36 is, for example, a Stratus database server, although any compatible database and processor combination with comparable functionality and capability may be used. It is understood that the CMR platform 30 may include any compatible elements with comparable functionality and capability as those depicted in FIG. 1 without departing from the spirit and scope of the present invention.

As previously stated, the web server 38 is connected to a web client 42 through the Internet 40. The web client 42 includes a graphical user interface that incorporates a web browser, such as Microsoft Internet Explorer, available from Microsoft Corporation, or Netscape Navigator, available from Netscape Communications Corporation. In one embodiment, the web client 42 is implemented with an IBM Pentium based PC, running the Linux operating system, available from, for example, Free Software Foundation, Inc., or the Microsoft Windows operating system, and running web browser software, such as Microsoft Internet Explorer, Netscape Navigator or HotJava, available from Sun Microsystems, Inc. An embodiment of the invention includes the web server 38 running the Linux or Microsoft Windows operating system and the Apache web server software, available from the Apache Software Foundation, or the Jigsaw web server software, available from World Wide Web Consortium (W3C). In alternative embodiments, the web server 38 interfaces with the web client 42 through a private intranet or other packet switched data network.

Figure 2:
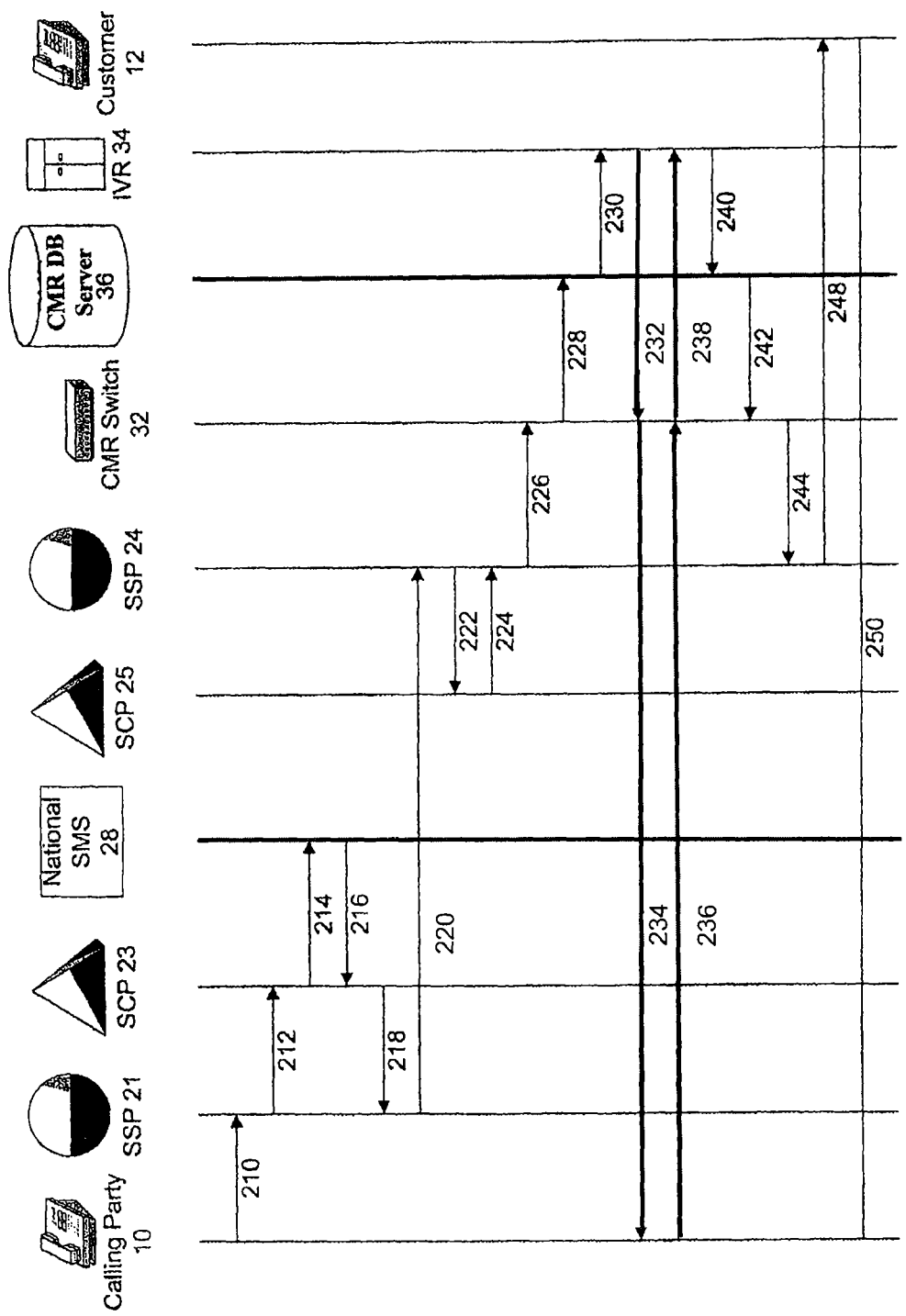
FIG. 2 is an exemplary call flow diagram showing routing of a telephone call to a terminating directory number, based on a toll-free number of a customer, according to an aspect of the present invention.

FIG. 2 is an exemplary call flow diagram depicting the general interaction among the network elements in response to a call to a CMR customer. At step 210, a calling party initiates a call to a toll-free number (e.g., an 800 number, an 888 number or the like) at the calling party telephone 10. The calling party's originating end office, the SSP 21, recognizes the dialed digits as a toll-free number. The SSP 21 accordingly suspends the call and launches a toll-free number trigger, querying the SCP 23 at step 212, for routing instructions. In an embodiment, the trigger and associated query are in a known AIN format for SS7 signaling, such as an 800 number trigger.

At step 214, the SCP 23 queries the national SMS 28 to determine the ownership of the toll-free number identified in the query from the SSP 21. Typically, the SMS 28 returns toll-free number data, including a carrier identification code (CIC) associated with the toll-free number, at step 216. The SCP 23 can then determine, for example, whether the carrier is a local or a long distance carrier. Alternatively, the SMS 28 periodically updates the SCP 23 with toll-free number data, including the toll-free number called by the calling party. Accordingly, the SCP 23 does not query the national SMS 28 at step 214, but rather retrieves the toll-free number data from its previously updated database. Regardless, the SCP 23 forwards the toll-free number data to the SSP 21 at step 218, along with instructions to route the call to the SSP 24, using trunk groups of the carrier identified by the CIC.

At step 220, the SSP 21 forwards the call to the SSP 24, which launches an AIN trigger, such as a shared inter-office trunk trigger, querying the SCP 25 at step 222 based on the toll-free number. The SCP 25 performs a look-up of the toll-free number, associates the number with CMR services and identifies the CMR switch 32 and/or the associated trunk group of the CMR platform 30. The SCP 25 instructs the SSP 24 to route the call to the switch 32 at step 224, which the SSP 24 does at step 226. The SSP 24 routes the call using known out-of-band signaling, including, for example, an SS7 initial address message.

The switch 32 suspends the call and contacts the database server 36 at step 228, which determines the CMR application based on the dialed number identification service (DNIS) data associated with the call. For example, the database server 36 accesses a customer account associated with the toll-free number and determines the customized routing instructions created by the customer for handling calls to the toll-free number.

Depending on the customized routing instructions, the database server 36 may determine that the caller must enter data in order to complete the call processing. For example, when the customer selects authorization code dependent routing, discussed below, the caller is required to enter a valid authorization code in response to voice prompting in order to complete the call. Likewise, in an exemplary form of call origin dependent routing, also discussed below, the caller enters his or her zip code in response to voice prompts in order for the database server 36 to route the call to the appropriate number.

When caller entered data is required, the database server 36 contacts the IVR 34 at step 230 to initiate the voice prompts designed to elicit the necessary information from the caller. In an embodiment of the invention, the voice prompts and associated scripts are designed and built by the customer at the web client 42 and the web server 38, as discussed below. The voice prompts may be synthesized by the IVR 34 or prerecorded by the customer.

At steps 232 and 234, the IVR 34 plays the scripted voice announcements and prompts to the calling party telephone 10 through the CMR switch 32. For example, the IVR 34 may prompt the caller to enter an authorization code, a call origination zip code, or some other menu of options customized to the customer's service. For example, the IVR 34 may announce an introductory welcome message and subsequently prompt the caller to "enter one to reach our sales department; two to reach our billing department; three to check the status of an order; or four for assistance." The caller enters the response to the voice prompting at steps 236 and 238 using the key pad of the DTMF telephone. In an embodiment of the invention, the IVR 34 includes voice recognition capability, enabling the caller to speak responses to the voice prompts. Depending on the customization of the customer's CMR service, as well as the caller's initial responses, the IVR 34 may provide additional voice prompts to collect additional data from the caller, as needed.

At step 240, the IVR 34 provides the data collected from the caller to the CMR database server 36 for processing. Based on the data, the CMR database server 36 determines the destination of the call, such as the POTS directory number or the switch ID and trunk group number to which the call made to the toll-free number is to be terminated. Determining the switch ID and trunk group number is more appropriate, for example, when the customer has a Centrex or PBX system that distributes incoming calls to numerous terminals.

When the database server 36 initially determines that the toll-free number does not require any interaction with the IVR 34, the database server 36 identifies the POTS directory number and/or the switch ID and trunk group number at which the call is to be terminated without interacting with the caller. Again, the processing depends on the customized instructions previously provided to the CMR platform 30 by the customer through the web server 38. For example, when the customer selects a time of day routing function, the database server 36 determines the call destination based on the current time. When the customer selects percentage allocation routing, the database server 36 determines the call destination based on the number of calls received and the percentage of calls already directed to alternative destinations.

The database server 36 passes the call routing information to the CMR switch 32 at step 242. At step 244, the CMR switch 32 forwards the call routing information to the SSP 24 and releases the trunk between the CMR switch 32 and the SSP 24 via release link transfer, for example. The SSP 24 continues processing the call using the newly acquired destination information. In particular, the SSP 24 routes the call to the customer telephone 12, through the PSTN 50, at step 248. A final connection is established between the calling party telephone 10 and the customer telephone 12, through the SSP 21 and the SSP 24, as indicated by step 250.

Depending on the customized service, the SSP 24 retains control of the call until completion. For example, when the customer selects busy-ring no answer functionality for the toll-free number, discussed below, the CMR database server 36 identifies an initial destination, along with at least one alternative destination, which are communicated to the SSP 24 by way of the CMR switch 32. When the initial destination is busy (or not answered after a predetermined number of rings), the SSP 24 attempts termination to the alternative destination.

Prior to processing the call as depicted in FIG. 2, the CMR platform 30 must be programmed to implement the customer's toll-free number plan. The programming includes two general stages. First, the service provider's administrator establishes the overall parameters for the CMR service, as well as for the particular customers. The administrator obtains the CMR service data by accessing the web server 38 over the Internet 40, using the web client 42. For example, the administrator identifies the toll-free numbers purchased by the customer, as well as the customer's associated switch ID numbers and trunk group numbers, if any. For example, a large customer may require installation of the dedicated trunk group to accommodate calls to the directory numbers associated with the toll-free numbers. This dedicated trunk group is programmed into the CMR service, so that the customer does not have the ability to access other trunk groups. In an embodiment, even smaller customers are assigned specific switch ID numbers and trunk group numbers, through which the customers can route calls. The switch ID numbers and trunk group numbers may be used to populate drop-down lists, enabling the customer to review and select the numbers for directing the routing of the various toll-free numbers.

The administrator also identifies the states or regions in which the customer may terminate calls, based on regulatory restrictions, contractual limitations and the like. In an embodiment of the invention, all customers are automatically entitled to terminate calls in the same regions, by default, unless otherwise indicated by the administrator. For example, as discussed above, regulations prohibit customers of a regional RBOC to terminate long distance calls in those states for which the regional RBOC provides local service (except to the extent the regional RBOC has obtained relief). Therefore, the CMR service would be programmed to prohibit associating toll-free numbers with POTS directory numbers located in the barred states, for example, based on the NPA/NXX of the POTS directory number. However, the administrator provides an indication for each customer exempt from the regulations governing the RBOCs with respect to the provision of long distance services, including customers that qualify as separate affiliates, discussed above.

The second stage of programming is performed by the customer within the parameters set by the administrator. The customer programming is likewise performed at the web server 38, which the customer accesses through the Internet 40, using any Internet compatible device. The customer essentially customizes its CMR service by specifying various elements relating to handling and routing calls to the customer's toll-free number. For example, in an embodiment of the invention, the customer is able to associate its toll-free numbers with POTS directory numbers and/or switch ID and trunk group numbers, specify the types of routing and build call trees, voice menus and announcements.

Figure 3:
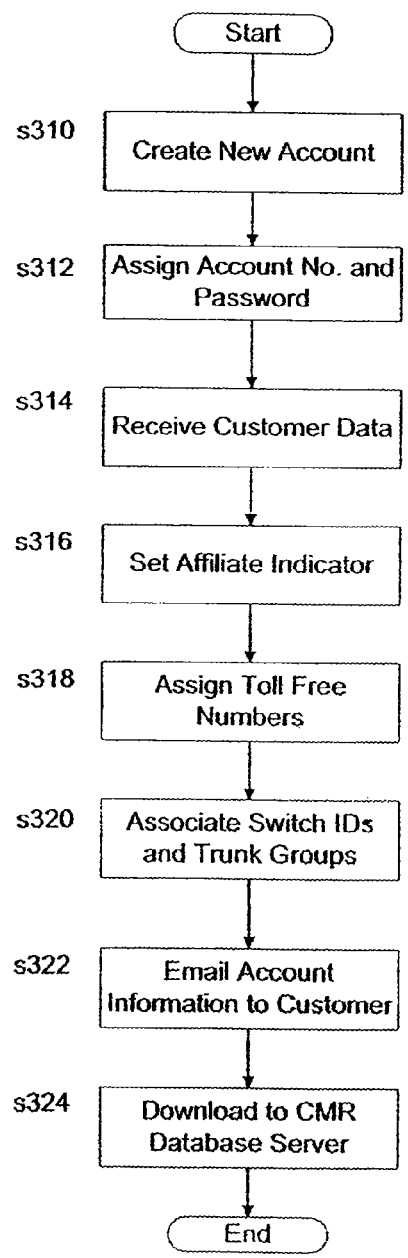
FIG. 3 is a flowchart of exemplary network platform service logic for creating a customer account, according to an aspect of the present invention.

FIG. 3 is a flowchart of exemplary service logic of the web server 38 for creating a customer account at the CMR platform 30. In an embodiment of the invention, the service logic is executed by the web server 38. The web server 38 is accessed by the administrator from the web client 42 over the Internet 40. The connection with the web server 38 may be a well known socket connection over transmission control protocol/Internet protocol (TCP/IP), for example, using HyperText Transfer Language Protocol (HTTP). The web server 38 is identified through an associated uniform resource locator (URL), receives HTTP requests from the web client 42 over the Internet 40 and serves HyperText Markup Language (HTML) or Extensible Markup Language (XML) documents in response.

The information received by the web server 38 is responsive to prompting by the web server 38, which is programmed in a form reasonably calculated to elicit the desired information. For example, the web server 38 may display a table or form having blank fields that the administrator fills in based on the identity of each field. Alternatively, the web server 38 may be programmed to request information through discrete fields consecutively displayed in a succession of web pages.

After authenticating the administrator, the web server 38 receives instructions to create a new customer account at step s310. The web server 38 determines and assigns a new customer account number and associated password at step s312. At step s314, the web server 38 receives descriptive information relating to the customer. For example, the customer's name, billing address, telephone numbers and the like are entered. In an embodiment of the invention, this information has been previously provided to the administrator after the service provider contracts with the customer to provide the CMR services.

At step s316, the web server 38 receives information regarding the customer's status as a RBOC affiliate. As discussed above, a customer must meet certain criteria in order to operate as an affiliate. The criteria focus on the customer's relationship with the parent RBOC, including for example, operating independently, keeping separate books and records, employing separate officers, directors and employees, and maintaining arm's length transactions. When the customer is an affiliate, the web server 38 receives instructions to set a blocking override indicator (e.g., an affiliate indicator), which is stored in association with the customer's account number. For example, an affiliate indicator field may be populated with the appropriate data indicating the affiliate status, such as a "1", a check mark, the word "yes" or the like. In alternative embodiments, blocking bypass indicators are available to override blocking limitations otherwise established with respect to the customers. For example, the service provider may not provide service in certain areas based on a standard contract with customers. The blocking bypass indicator may then be set for those customers who purchase an upgraded or expanded service that includes the otherwise blocked areas.

The toll-free numbers assigned to the customer are entered at step s318. The contractual terms between the toll-free service provider and the customer dictates the number of toll-free numbers to which the customer is entitled and, in some instances, the specific numbers themselves. For example, the customer may wish to have a number that spells a particular word relating to the name or type of business.

At step s320, the web server 38 receives data indicating the switch ID and trunk group numbers (if any) that are set aside for use by the customer. In an embodiment of the invention, the switch ID and trunk group numbers designate dedicated trunk groups that are installed and/or reserved to specifically accommodate the customer's toll-free number service. The switch ID and trunk group numbers are determined based on the location of the customer's telephone terminals, such as, for example, the location of the customer's call service center. When the customer only wants the ability to associate toll-free numbers with POTS directory numbers, there is no need for the administrator to identify the switch ID and trunk group numbers.

Once the basic parameters of the toll-free service have been established, a summary of the parameters is emailed from the web server 38 to the customer via the Internet 40, according to an embodiment of the invention, at step s322. The contents of the email may vary without affecting the spirit and scope of the present invention. At a minimum, however, the customer receives an account number and associated password, so that the customer can access the web server 38 to review the other parameters associated with the service. The customer may be notified of the account parameters by any effective form of communication without departing from the spirit and scope of the present invention.

At step s324, the web server 38 downloads the toll-free service parameters to the CMR database server 36. The information is transmitted using a known data signaling, such as TCP/IP signaling, transaction capabilities application part (TCAP) over TCP/IP signaling, session initiation protocol (SIP) signaling, and/or HTTP signaling. The CMR database server 36 does not download the service parameters to the SCP 25. The SCP 25 stores data indicating the toll-free numbers associated with the CMR platform 30, but does not need to store data on the individual customers. When the SCP 25 receives a query indicating a toll-free number associated with the CMR platform 30, it simply instructs the SSP 24 to route the call to the CMR platform 30, as discussed with respect to steps 222 and 224 of FIG. 2. The CMR platform 30 processes the call to provide additional routing instructions for call termination.

Figure 4:
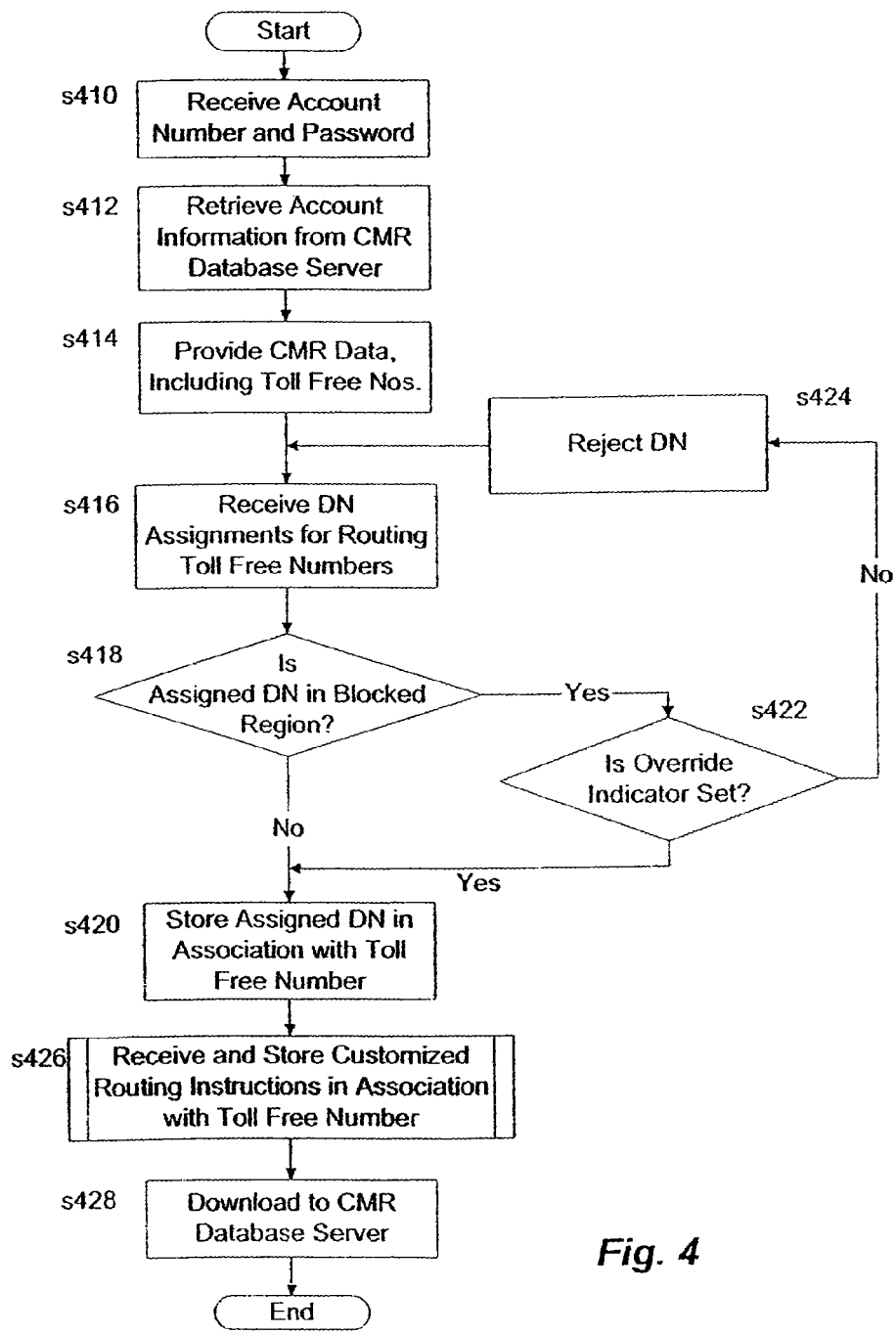
FIG. 4 is a flowchart of exemplary network platform service logic for customizing the customer account, according to an aspect of the present invention.

FIG. 4 is a flowchart of exemplary service logic of the web server 38 for customizing the customer's toll-free service according to instructions from the customer, within the parameters previously established by the administrator. Initially, the customer receives the account number and password information by email from the web server 38. As stated above, the email may contain additional basic information, such as the name and address of the customer and the toll-free numbers for which it has contracted.

The customer accesses the web server 38 over the Internet 40 from a web client 42, which is any Internet compatible terminal, such as a PC, using the URL of the web server 38. In response to prompting, the web server 38 receives the account number and password information from the customer at step s410. In an embodiment of the invention, the email received by the customer includes the URL of the web server 38 in a link, so that the customer may access the web server 38 by simply opening the link in the email. The customer may change its password after initially accessing the CMR service.

At step s412, the web server 38 retrieves the CMR data related to the customer's CMR account from the CMR database server 36. The web server 38 provides the data to the customer at step s414. The data necessarily includes the toll-free numbers that have been assigned to the customer. The format in which the data is provided to the customer is not limited. For example, the data may be presented all at once, in summary form, or the data may be presented in segments on various web pages in response to specific requests by the customer. Regardless, the customer is ultimately presented with a listing of the available toll-free numbers.

In an embodiment of the invention, the web server 38 receives the POTS numbers respectively associated with the toll-free numbers at step s416. For example, each of the toll free numbers may include an adjacent field in which the customer enters at least one 10 digit directory number to which calls to that toll-free number will terminate. As discussed above, although FIG. 4 is described with respect to POTS directory numbers being associated with toll-free numbers for purposes of enhancing clarity, it is understood that the CMR service may be based on associating any numbers adequately identifying resources to which calls may be routed, such as switch ID numbers and/or trunk group numbers, with the toll-free numbers without departing from the spirit and scope of the present invention.

At step s418, the web server 38 determines whether the POTS directory number entered by the customer is in a region in which calls to that number would be blocked. For example, when the service provider is a RBOC (without Section 272 relief), directory numbers within the RBOC's local area are blocked from receiving long distance calls, even when the call originated as a toll-free call. When calls to the entered directory number would not be blocked, the web server 38 stores the POTS directory number in association with the toll-free number in the customer's CMR account at step s420.

When calls to the selected directory number would be blocked, the web server 38 determines whether the blocking override indicator has been set with respect to the customer at step s422. For example, when blocking occurs because the customer attempts to associate a number in a local area of a RBOC, the web server 38 determines whether an affiliate indicator has been set for the customer at step s422. In other words, the web server 38 determines whether the customer has been designated a separate affiliate of the RBOC, such that the customer may receive long distance calls in an otherwise proscribed region.

When no override indicator has been set, the POTS directory number is rejected by the web server at step s424. The web server 38 notifies the customer accordingly and returns to step s416 to receive another directory number to be associated with the toll free number. The cycle is repeated until the customer enters a directory number that is not blocked. When an override indicator has been set, the web server 38 determines that the directory number is acceptable and proceeds to step s420, storing the directory number in association with the toll-free number.

At step s426, the web server 38 receives and stores additional customized routing instructions relating to each toll-free number. For example, the customer specifies the criteria for routing calls to various POTS directory numbers. In the simplest form, the customer merely associates one POTS directory number with each toll-free number, so that calls made to the toll-free number are routed to the associated POTS directory number. Alternatively, the customer may route calls to a single toll-free number to one of multiple POTS directory numbers based on additional criteria or combinations thereof. Examples of various routing criteria established by the customer are as follows:

Time-of-day and/or day-of-week (TOD/DOW) routing: When TOD/DOW routing is selected, the customer builds a routing schedule based on times and days of the week. The customer identifies at least one time period during which calls to a particular toll-free number are routed to a first POTS directory number, and a second time period during which the calls are routed to a second POTS directory number. For example, during known busy periods, the customer can associate each toll-free number with a separate POTS directory number; while during known slow periods, all toll-free numbers may be directed to the same POTS directory number.

Origin dependent routing: When origin dependent routing is selected, the customer builds a grid, for example, specifying the POTS directory number to which calls terminate based on the geographic origin of the call. The customer also decides the manner in which the call origin is determined. For example, the customer may select area code or NPA/NXX based call origination, in which case automatic number identification (ANI) signals, which identify the calling party number, are used to determine the area code and/or the NPA/NXX of the calling party. The customer therefore associates a call origin area code with a corresponding POTS directory number for call termination of each toll-free number. Similarly, the customer may select zip code based call origination, in which case ANI signaling may be used in combination with a database of zip codes to determine the zip code of the area in which the call originates. Alternatively, the IVR 34 may be programmed by the customer (via the web server 38) to play a series of voice announcements to a caller to have the caller enter his or her zip code during the call. Regardless of the manner in which the zip code is determined, the customer must first associate each potential call origin zip code with a corresponding POTS directory number for termination of calls to each toll-free number.

Authorization code routing: When authorization code routing is selected, the customer builds routing logic around authorization codes that are provided to callers or groups of callers. For example, authorization codes may relate to products purchased by the customer's clientele. By associating the authorization codes with selected POTS directory numbers, the customer can assure, for example, that the appropriate customer service personal are contacted regarding the corresponding products. As discussed above, the customer programs the IVR 34 (via the web server 38) to play voice announcements requesting the caller to enter his or her authorization code. In alternative embodiments, the authorization codes designate any subset of callers that may be using the same toll-free number, including caller identification or other security related measures.

Percentage allocation routing: When percentage allocation routing is selected, the customer is given the option of terminating calls to a single toll-free number to multiple POTS directory numbers based on a percentage of incoming calls. For example, the customer may designate two POTS directory numbers for a toll-free number and indicate that 50 percent of all calls to the toll-free number are routed to each of the two POTS directory numbers. The web server 38 implements various restrictions on the customer's instructions. For example, the percentage allocations must add up to 100 percent, or the web server 38 refuses to enter the customer's instructions.

Busy-ring no answer routing: When busy-ring no answer routing is selected, the customer is given the option to identify primary and secondary POTS directory numbers in association with each toll-free number. Based on this information, calls to the toll-free number are initially terminated to the primary POTS directory number. When that number is busy, or is not answered after a predetermined number of rings, the calls to the toll-free number are terminated to the secondary POTS directory number. The customer is able to customize several features for busy-ring no answer routing. For example, the customer may select the primary number, any number of secondary numbers, the order in which the secondary numbers are summoned, the number of rings that results in routing to the next secondary number and the like. In an alternative embodiment, the customer enables the busy-ring no answer functionality by identifying a primary switch ID number and/or trunk group number, along with secondary switch ID numbers and/or trunk group numbers or secondary POTS directory numbers.

International origin dependent routing: For calls that originate in a non-domestic area, i.e., a country other than the United States and Canada, the customer similarly builds a grid, for example, specifying the POTS directory number to which calls terminate based on the country of origin of the call. The customer also decides the manner in which the country of call origin is determined. For example, the customer may select automatic country identification, in which case an international gateway servicing the incoming call inserts a predetermined country code into the NPA-NXX of the calling party number in the ANI signal. The customer associates the country in which the call originates with a corresponding POTS directory number for termination of the customer's toll-free number. Alternatively, the IVR 34 may be programmed by the customer (through the web server 38) to play a series of voice announcements instructing the caller to enter the country in which the call originates. Advantages of international origin dependent routing include the ability to direct calls from foreign countries to POTS directory numbers staffed by attendants who speak the respective foreign languages. International origin dependent routing is discussed in detail with respect to FIGS. 5-7, below.

After the web server 38 receives and stores the customized routing instructions from the customer relating to the toll-free numbers, it downloads the data to the CMR database server 36 at step s428. The CMR database server 36 stores the customized instructions, along with the previously stored parameters entered by the administrator, in association with the toll-free numbers. Therefore, the CMR database server 36 executes the instructions when accessed by the CMR switch 32 (e.g., step 228 of FIG. 2) for call routing instructions during real-time call processing.

Figure 5:
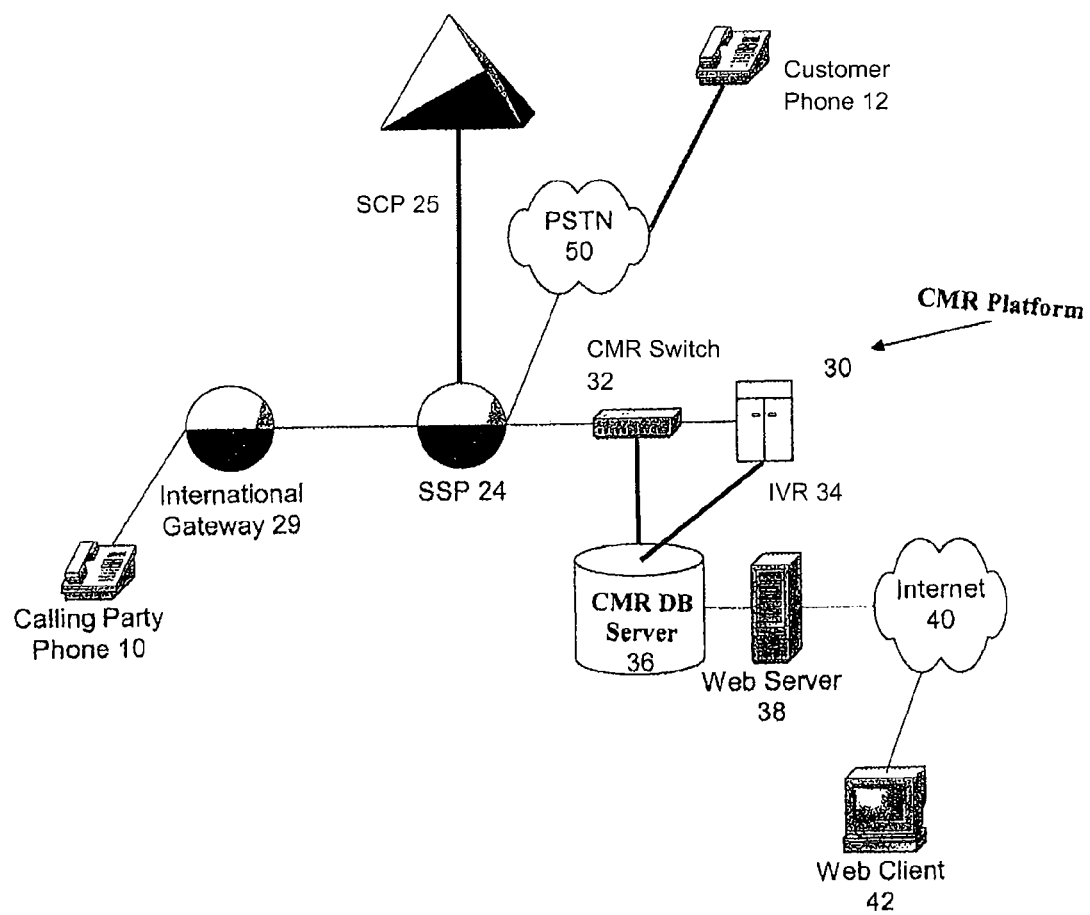
FIG. 5 is a block diagram showing an exemplary telecommunications network for routing calls originating internationally, according to an aspect of the present invention.

FIG. 5 illustrates an exemplary telecommunications network of the present invention that enables international origin dependent routing, discussed above. FIG. 5 is the same as FIG. 1 to the extent that it depicts network elements having the same reference numerals, although it is understood that the calling party telephone 10 shown in FIG. 5 is located in a non-domestic country. Accordingly, the depicted telecommunications network differs from FIG. 1 in that the SSP 21, the SCP 23 and the National SMS 28 are not involved. Instead, an international gateway 29 receives the call from the calling party telephone 10 when it arrives at the domestic telecommunications network.

In an embodiment of the invention, the international gateway 29 includes a processing platform and switch. For example, the international gateway 29 may include an Adjunct-IN-Node/Summa4 platform and a DMS-300 switch, available from Cisco and Nortel, respectively. The international gateway 29 is configured to communicate with other network elements, including the SSP 24 and the SCP 25, using well known out-of-band signaling, such as SS7 signaling. For example, the DMS-300 switch routes the call and provides signaling to the SSP 24 based on routing instructions provided by the Adjunct-IN-Node platform.

More particularly, a call directed to the customer's toll-free number is initiated at the calling party telephone 10 in a non-domestic country, and routed by a Foreign Administration or Foreign Telephone Company (e.g., the international equivalent of a LEC) to an international carrier. Referring to step 610 of FIG. 6, the international carrier delivers the call to the international gateway 29, which serves as the domestic interface for the call. The international gateway 29 processes the incoming call at step 612. In an exemplary embodiment of the invention, the international gateway 29 determines ownership of the toll-free number and identifies associated routing data, such as the CIC and corresponding trunk groups.

The foreign ANI is not passed beyond the Foreign Telephone Company's network. Therefore, the international gateway 29 creates and populates a pseudo-ANI signal for the call that contains information identifying the call as non-domestic and identifying the specific country of origin. The pseudo-ANI may also contain information for bill presentation and segmentation. For example, the international gateway 29 inserts the numerical code 999 in the NPA field of the calling party number in the pseudo-ANI to identify the call as having a non-domestic origin. Other three digit codes may be inserted in the NPA of the calling party number to identify non-domestic origin, as long as the NPA is not one recognized by the PSTN as an assigned area code. The international gateway 29 may also insert the three digit predetermined country code, discussed above, in the NXX field of the calling party number to identify the specific country of origin.

In an exemplary embodiment of the invention, the predetermined country codes correlate with the country codes provided in the List of ITU-T Recommendation E.164 Assigned Country Codes (2002), available from the International Telecommunication Union (ITU), well known in the telecommunications industry, the contents of which is expressly incorporated by reference herein in its entirety. (The leading digits of the NXX are "0" when the appropriate country code is only one or two digits.) It is understood that the specific numerical code and/or country code, as well as the placement of these codes within the pseudo-ANI, may vary without departing from the spirit and scope of the present invention. However, any code inserted in the NPA field cannot match a valid NPA otherwise recognized by the PSTN as a specific area code.

In an embodiment of the invention, the processing performed by the international gateway 29 further includes translating an international routing number or international toll-free number into a domestic toll-free number of the customer or a pseudo domestic telephone number (e.g., a pseudo toll-free number). An international toll-free number is assigned by the Foreign Administration or the ITU, for example. In an embodiment, the international toll free number is a international freephone service number or a universal international freephone number, known in the industry. It has an alphanumeric value, ranging from six to twenty digits in length, for example.

A pseudo toll-free number carries the same attributes as a North American Numbering Plan (NANP) telephone number, but the NPA of the pseudo toll-free number will be one that is not defined in the National SMS 28. For example, the pseudo toll-free number may begin with 811 to be distinguishable from the standard toll-free numbers (e.g., having NPAs of 800, 877, 888 or 866). Like the customer's toll-free number, the pseudo toll-free number may be used to identify the carrier and trunks through which the call is to be routed, as well as to identify the call as requiring CMR services. The international gateway 29 and/or the SCP 25 track the association between the originally dialed international toll-free number and the pseudo toll-free number, as they are assigned to the customer using, for example, a number mediation system.

At step 614, the international gateway 29 forwards the call, along with the pseudo-ANI and other toll-free number data, to the regional SSP 24, using trunk groups of the carrier identified by the CIC, for example. As in the case of calls originating domestically, shown in FIG. 2, the SSP 24 then launches an MN trigger, such as a shared inter-office trunk trigger, querying the SCP 25 at step 622 based on the toll-free number. The SCP 25 performs a look-up of the toll-free number (or the pseudo toll-free number), associates the number with CMR services and identifies the CMR switch 32 and/or the associated trunk group of the CMR platform 30. The SCP 25 instructs the SSP 24 to route the call, including the pseudo-ANI, to the switch 32 at step 624, which the SSP 24 does at step 626. The SSP 24 routes the call using known out-of-band signaling, such as an SS7 initial address message.

The switch 32 suspends the call and contacts the database server 36 at step 628, which determines the CMR application based on DNIS data associated with the call, as discussed above with respect to FIG. 2. The switch 32 and the database server 36 also receive an indication that the call originated non-domestically, as indicated by the NPA of the pseudo-ANI. In an embodiment of the invention, the database server 36 further determines the specific country of origin based on the country code inserted in the NXX of the pseudo-ANI. The database server 36 is then able to determine whether the customer has identified any special routing instructions based on the toll-free number, the specific country of origin and/or the fact that the call originated non-domestically.

Also, depending on additional customized routing instructions, the database server 36 may determine that the caller must enter data in order to complete the call processing. For example, when the customer selects authorization code dependent routing, the caller is required to enter a valid authorization code in response to voice prompting in order to complete the call. In an embodiment of the invention, the voice prompting may be provided in a foreign language corresponding to the country of origin, based on previous programming of the customized routing service by the customer through the web server 38, discussed with respect to FIG. 7, below.

As likewise shown in FIG. 2, when caller entered data is required, the database server 36 contacts the IVR 34 at step 630 to initiate the voice prompts designed to elicit the necessary information from the caller. At steps 632 and 634, the IVR 34 plays the scripted voice announcements and prompts to the calling party telephone 10 through the CMR switch 32. For example, the IVR 34 may prompt the caller to enter an authorization code or some other menu of options customized to the customer's service. In an alternative embodiment, in which the database server 36 recognizes that the call originated non-domestically based on the 999 NPA, but does not receive information regarding the specific country of origin from the NXX, the IVR 34 may prompt the caller to identify the country from which the call originates. The identification may take any form, including speaking the country name, spelling the country name using the touch tone keypad of the calling party telephone 10, or selecting the country from a menu of foreign countries provided by the IVR 34. Typically, when the customized menu routing service only provides one or two foreign language options, the caller will be limited to identifying only those countries corresponding to the provided language options. Otherwise, the call will be directed to the default POTS directory number(s) and/or trunk groups.

The caller enters the response to the voice prompting at steps 636 and 638 using the key pad of the DTMF telephone. In an embodiment of the invention, the IVR 34 includes voice recognition capability, enabling the caller to speak responses to the voice prompts.

At step 640, the IVR 34 provides the data collected from the caller to the CMR database server 36 for processing. Based on the data, the CMR database server 36 determines the destination of the call, such as the POTS directory number or the switch ID and trunk group number to which the call made to the toll-free number is to be terminated. When the customized menu routing does not involve use of the IVR 34, the CMR database server 36 determines the destination of the call based on other available data, including for example the toll-free number and the country code associated with the non-domestic call origin, along with the customized instructions previously provided to the CMR platform 30 by the customer through the web server 38.

The database server 36 passes the call routing information to the CMR switch 32 at step 642. At step 644, the CMR switch 32 forwards the call routing information to the SSP 24 and releases the trunk between the CMR switch 32 and the SSP 24 via release link transfer, for example. The SSP 24 continues processing the call using the newly acquired destination information. In particular, the SSP 24 routes the call to the customer telephone 12, through the PSTN 50, at step 648. A final connection is established between the non-domestic calling party telephone 10 and the customer telephone 12, through the international gateway 29 and the SSP 24, as indicated by step 650.

Figure 6:
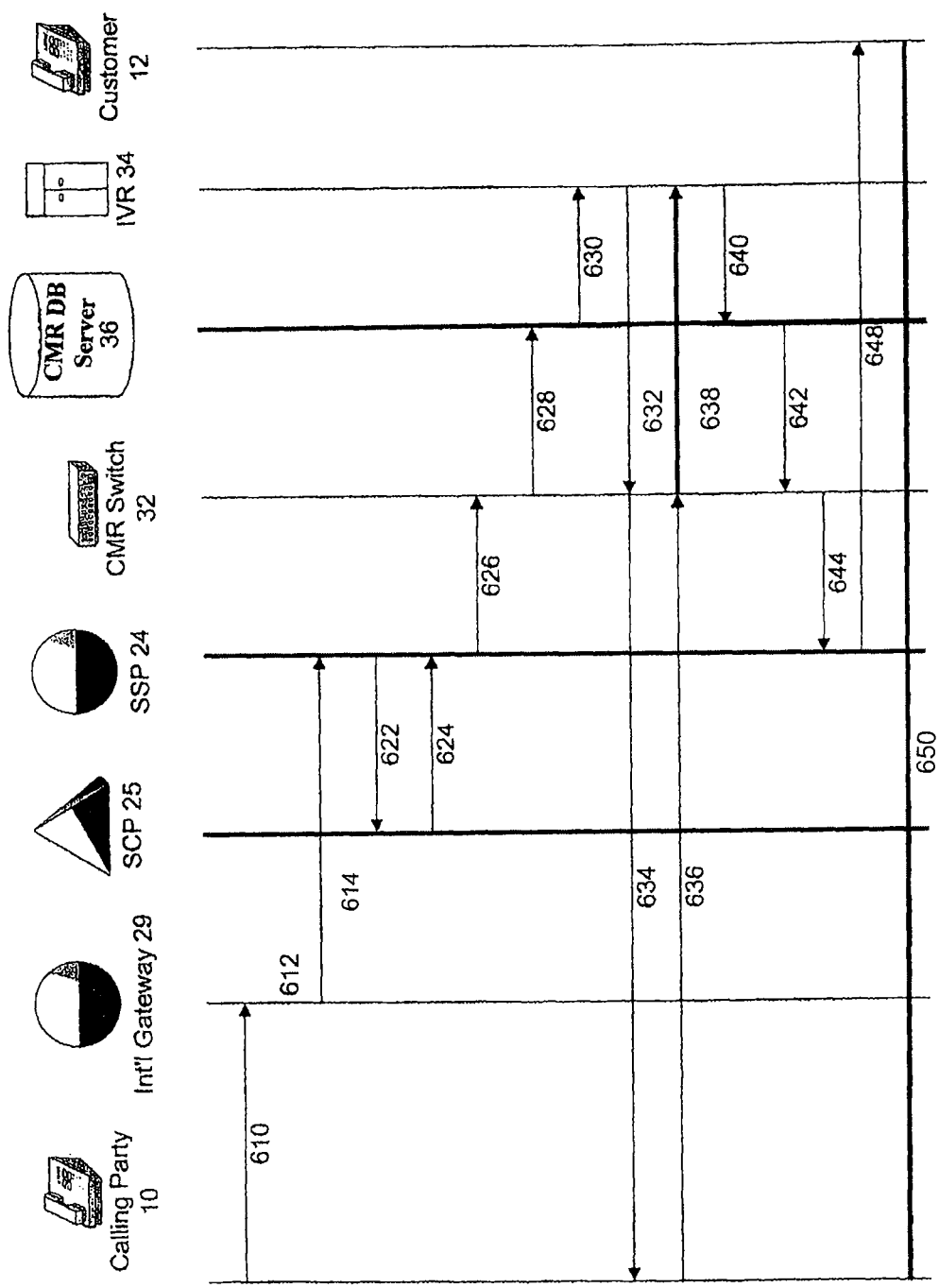
FIG. 6 is an exemplary call flow diagram showing routing of a telephone call originating internationally to a terminating directory number, based on a toll-free number of a customer, according to an aspect of the present invention.
Figure 7:
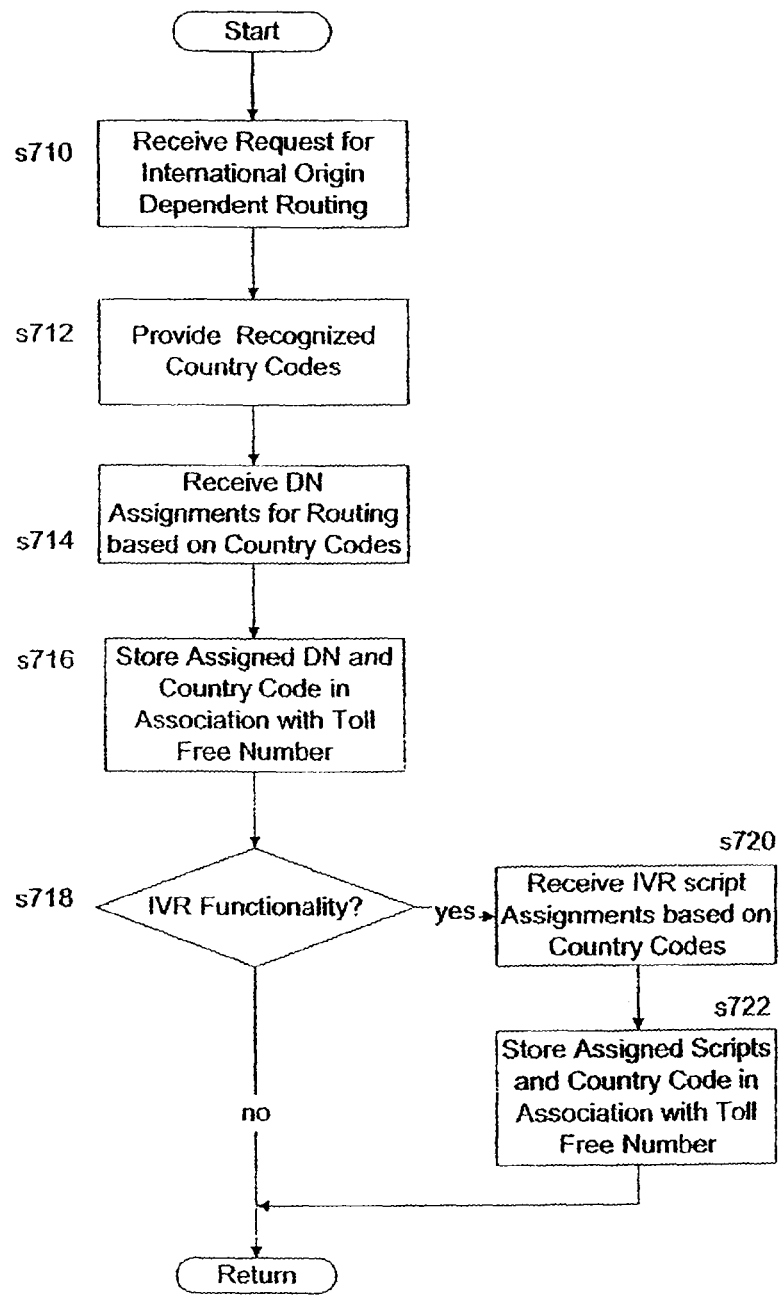
FIG. 7 is a flowchart of exemplary network platform service logic for customizing the customer account to route calls based on country of origin, according to an aspect of the present invention.

As discussed above with respect to FIG. 2, in order to process the call as depicted in FIG. 6, the CMR platform 30 must be programmed to implement the customer's toll-free number plan, including international origin dependent routing. FIG. 7 is a flowchart of exemplary service logic of the web server 38 for customizing the toll-free service according to instructions from the customer with respect to international origin dependent routing, in particular. International origin dependent routing is selected, for example, at step s426 of FIG. 4. The web server 38 receives the request for international origin dependent routing over the Internet 40 from the web client 42 at step s710 of FIG. 7. In response, the web server 38 sends web pages requesting information regarding the desired countries of origin and associated POTS directory numbers (or other termination identifiers, as discussed above).

In the depicted embodiment of the invention, the web server 38 also provides the customer with the predetermined country codes for the various foreign countries, as recognized by the web server 38, at step s712. As stated above, the country codes may correlate with the two-three digit country codes provided in the List of ITU-T Recommendation E.164 Assigned Country Codes, although any distinct predetermined numerical code, recognizable by the web server 38, as well as the international gateway 29 may be used by the customer to designate the country of origin, without departing from the spirit and scope of the present invention. In an alternative embodiment, the customer enters the selected countries of origin by name and the web server 38 determines the country code automatically, e.g., using a look-up table, based on the entered country name.

As discussed above, the customer may be limited in its selection of originating countries. For example, the customer and/or service provider may offer POTS directory numbers dedicated to handling only one foreign language. In an embodiment of the invention, the web server 38 provides a drop-down list of all countries and/or associated country codes for which international origin dependent routing is available. For example, when the customer and/or service provider offers an alternative POTS directory number having Spanish speaking attendants, the list of available countries of origin may include Spain (country code 034), Mexico (country code 052), Argentina (country code 054) and Chile (country code 056).

At step s714, the web server 38 receives the directory number assignments from the web client 42, in association with the respective international origin country codes, entered by the customer at the web client 42. This data is stored by the web server 38 at step s716.

In the depicted embodiment, the web server 38 also determines at step s718 whether IVR functionality is required during call processing. For example, when the customer has selected authorization code routing in addition to international origin dependent routing, the web server 38 determines that the IVR 34 must initiate and play a script during call processing requesting the calling party to enter an authorization code. Alternatively, the web server 38 queries the customer at the web client 42 to identify any IVR scripts associated with processing calls to the subject toll-free number.

Once it is determined that an IVR script is involved, the web server 38 further determines a script assignment, based on the identified country of origin, at step s720. For example, the web server 38 identifies a Spanish IVR script relating to authorization code routing when Spain is selected as a international origin country. As stated above, the customer is able to build and/or record IVR announcements and scripts over the Internet 40, including the foreign language scripts that the customer wishes to have associated with the various countries of origin. The association between the assigned scripts and the respective countries of origin are stored in the CMR database 36 at step s722. After an IVR script is determined not to be involved at step s718, or after the association between the assigned scripts and the respective countries of origin are stored at step s722, the web server 38 returns to the main process depicted in FIG. 4.

After the web server 38 receives and stores the customized routing instructions from the customer relating to the toll-free numbers, including international origin dependent routing instructions and/or IVR programming, it downloads the data to the CMR database server 36 at step s428 of FIG. 4. The CMR database server 36 stores the customized instructions, along with the previously stored parameters entered by the administrator, in association with the toll-free numbers. Therefore, the CMR database server 36 executes the instructions when accessed by the CMR switch 32 (e.g., step 628 of FIG. 6) for call routing instructions during real-time call processing.

Figure 8:
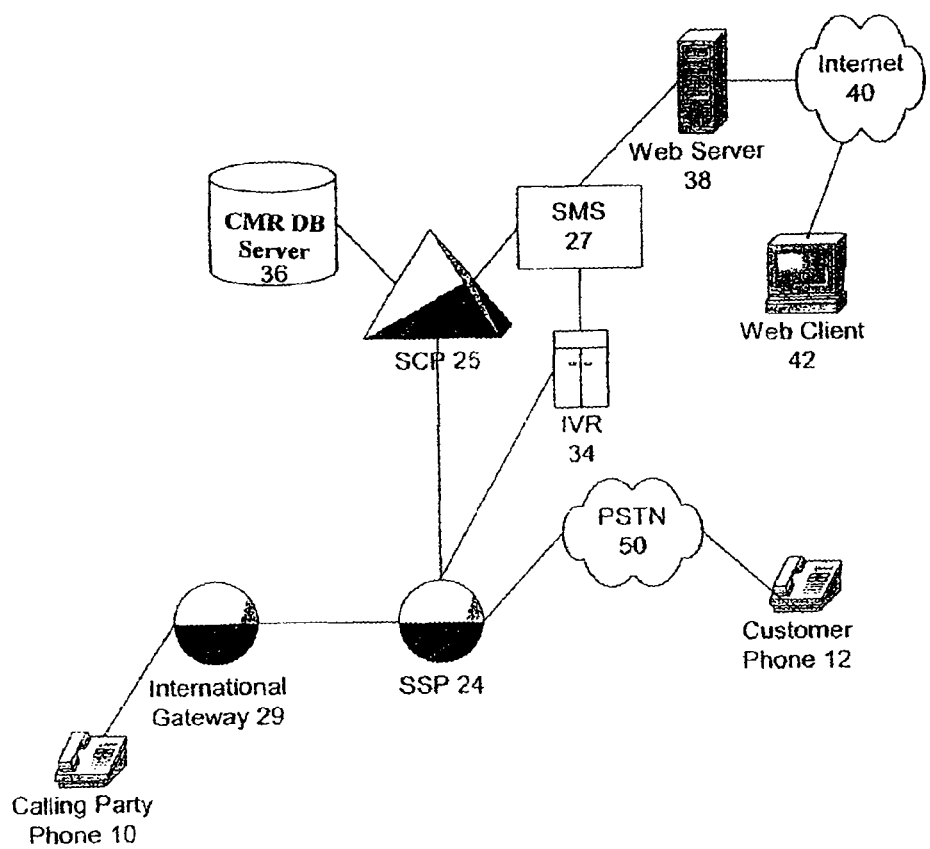
FIG. 8 is a block diagram showing an exemplary telecommunications network of an alternative embodiment for routing call originating internationally, according to an aspect of the present invention.

In alternative embodiments of the present invention, the customized routing data, including blocking override indicators and international origin dependent routing instructions, are maintained and implemented by a processor within the PSTN, such as the SCP 25. FIG. 8 illustrates an exemplary telecommunications network of such an alternative embodiment, in which the calling party telephone 10 is located in a non-domestic country, as also shown in FIG. 5. Accordingly, the depicted telecommunications network of FIG. 8 differs from FIG. 1 in that the SSP 21, the SCP 23 and the National SMS 28 are not involved. However, it is understood that the SSP 21, the SCP 23 and the National SMS 28 would be included in the embodiment of FIG. 8 for domestically originating calls and would function in the same manner as discussed above with respect to FIGS. 1 and 2.

The exemplary telecommunication network of FIG. 8 does not include the CMR platform 30 external to the PSTN. In its place, the network includes an SMS 27, which interfaces between the web server 38 and the SCP 25 in a known manner. Therefore, the customer is able to access routing data from the CMR database 36 (which may be internal to the SCP 25) through the SCP 25. Alternatively, the CMR database 36 is accessed directly by the web server 38, in which case the SMS 27 interfaces the SCP 25 with the CMR database 36. The customized routing data and instructions are implemented by the customer in the same manner discussed above with respect to the CMR platform 30.

Likewise, in order to implement the customized routing of a call, the SCP 25 does not instruct the SSP 24 to forward the customer's toll-free calls to the CMR platform 30. Rather, the SSP 24 simply suspends each call and queries the SCP 25 for instructions, as discussed above. The SCP 25 accesses the CMR database 36, acquires the applicable routing data and accordingly instructs the SSP 24 to route the call to the customized POTS directory number, switch identification ID number and/or a trunk group number, based in part, for example, on the non-domestic country of origin. When the routing data requires voice interaction with the caller, the SCP 25 instructs the SSP 24 to play the appropriate voice script or menu to the calling party telephone 10 through the IVR 34 and the SSP 24, in the same manner as discussed above. The caller's responses are input to the SCP 25 through the SMS 27 and used to further determine call routing.

Accordingly, the present invention enables a CMR platform, within or accessible by the PSTN, to control routing of calls to toll-free numbers based on specific parameters and customized instructions entered by the service administrator and the customer, respectively, through a web server. The customized instructions include identifying the POTS directory number and/or the switch ID and trunk group numbers to which calls to a toll-free number of the customer are to be terminated based on, for example, the country of origin for calls originating non-domestically. The administrative parameters include call blocking provisions that prohibit termination of calls to the toll-free number to certain POTS directory numbers and/or switch ID and trunk group numbers, based on general contractual, regulatory or other restrictions on the service provider, the customer or both. The parameters further include a blocking override indicator, when appropriate, which indicates that the particular customer is entitled to override the general restrictions. Neither the call blocking provisions nor the blocking override indicator can be manipulated by the customer.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission (e.g., SIP, TCAP, TCP/IP, HTTP, HTML, XML) and public telephone networks (e.g., AIN, SS7) represent examples of the state of the art. Such standards are periodically superseded by faster or more efficient equivalents having essentially the same functions. Accordingly, replacement standards and protocols having the same functions are considered equivalents.

What is claimed is:

1. A non-transitory computer-readable storage medium encoded with an executable computer program for routing international communications and that, when executed by processor, causes the processor to perform operations comprising:
   receiving, from an international gateway via a network node, international communication origination data for an international communication to a customer's communication address;
   receiving customer routing instructions from the customer via a web server;
   storing the received customer routing instructions;
   retrieving the stored customer routing instructions;
   determining a first destination communication address based on the international communication origination data and the retrieved customer routing instructions; and
   forwarding the first destination communication address to the network node for routing the international communication to the first destination communication address.

2. The non-transitory computer-readable storage medium according to claim 1,
   wherein the first destination communication address comprises one of a plain old telephone service directory communication address, a switch identification communication address and a trunk group communication address.

3. The non-transitory computer-readable storage medium according to claim 1,
   wherein customer routing instructions and the first destination communication address vary by country of origin of the international communication.

4. The non-transitory computer-readable storage medium according to claim 1, further comprising:
   populating a requesting party communication address field of the international communication with a code corresponding to the country of origin of the international communication; and
   routing the international communication to the first destination communication address in accordance with the received instructions based on the code.

5. The non-transitory computer-readable storage medium to claim 1, further comprising:
   routing a communication to the first destination communication address originating domestically to a second destination communication address in accordance with the received instructions.

6. The non-transitory computer-readable storage medium according to claim 1,
   wherein the first destination communication address is further determined based on input received via an interactive voice unit.

7. A non-transitory computer-readable storage medium encoded with an executable computer program for routing international calls to a toll-free number of a customer in accordance with a customized routing service and that, when executed by a processor, causes the processor to perform operations, comprising:
   receiving, by an international gateway, a call to the customer's toll-free number, wherein the international gateway populates a calling party number field of the call to the toll-free number originating in a first non-domestic country with at least a first code corresponding to the first non-domestic country;
   receiving, by a network switch, the call from the international gateway based on at least an identification of a carrier associated with the toll-free number;
   receiving, by a customized menu routing platform, the call and non-domestic call origination data from the network switch,
   wherein the customized menu routing platform:
   stores, in a customized menu routing database server, routing instructions received from a web server,
   determines a first destination number of the customer for calls to the toll-free number originating in a first non-domestic country, based on the non-domestic call origination data and the stored routing instructions received from the web server, accessible by the customer via a packet switched data network, and
   forwards the first destination number to the network switch for routing the call to the first destination number.

8. The non-transitory computer-readable storage medium according to claim 7, in which the packet switched data network comprises a public Internet.

9. The non-transitory computer-readable storage medium according to claim 7, in which the first destination number comprises one of a plain old telephone service directory number, a switch identification number and a trunk group number.

10. The non-transitory computer-readable storage medium according to claim 7, wherein the customized menu routing platform: receives instructions from the customer via the packet switched data network associating the toll-free number with a second destination number of the customer for calls to the toll-free number originating in a second non-domestic country; populates a calling party number field of the call to the toll-free number originating in the second non-domestic country with at least a second code corresponding to the second non-domestic country; and routes the call to the second destination number in accordance with the received instructions, based on the second code.

11. The non-transitory computer-readable storage medium according to claim 7, further comprising: routing a call to the toll-free number originating domestically to a second destination number in accordance with the received instructions.

12. A non-transitory computer-readable storage medium encoded with an executable computer program for routing international communications and that, when executed by processor, causes the processor to perform operations comprising:
   receiving, from an international network interface via a network node, international communication origination data for an international communication to a communication address of a user;
   receiving user routing instructions from the user via a server;
   storing the received user routing instructions;
   retrieving the stored user routing instructions;
   determining a first destination communication address based on the international communication origination data and the retrieved user routing instructions; and
   forwarding the first destination communication address to the network node for routing the international communication to the first destination communication address.

13. The non-transitory computer-readable storage medium according to claim 12,
   wherein the first destination communication address comprises one of a plain old telephone service directory communication address, a switch identification communication address and a trunk group communication address.

14. The non-transitory computer-readable storage medium according to claim 12,
   wherein user routing instructions and the first destination communication address vary by country of origin of the international communication.

15. The non-transitory computer-readable storage medium according to claim 12, further comprising:
   populating a requesting party communication address field of the international communication with a code corresponding to the country of origin of the international communication; and
   routing the international communication to the first destination communication address in accordance with the received instructions based on the code.

16. The non-transitory computer-readable storage medium to claim 12, further comprising:
   routing a communication to the first destination communication address originating domestically to a second destination communication address in accordance with the received instructions.

17. The non-transitory computer-readable storage medium according to claim 12,
   wherein the first destination communication address is further determined based on input received via an interactive voice unit.

18. The non-transitory computer-readable storage medium according to claim 12, wherein the server comprises a web server connected to a web client through the Internet.

19. The non-transitory computer-readable storage medium according to claim 12, wherein the server comprises a web server connected to a web client through a private intranet.

20. The non-transitory computer-readable storage medium according to claim 12, wherein the server comprises a web server that transmits a web address to the user via email.

* * * * *